United States Patent [19]
Matsuo et al.

[11] Patent Number: 6,068,177
[45] Date of Patent: May 30, 2000

[54] CONTINUOUS HOT ROLLING METHOD

[75] Inventors: Shinji Matsuo; Katsuhiro Maeda; Seiji Arizumi, all of Oita; Katsuhiro Minamida; Masahiro Ohara, both of Futtsu; Takaaki Nakamura; Hiroki Kato, both of Oita; Shigeru Nishibayashi, Futtsu; Masakazu Abe, Oita, all of Japan

[73] Assignee: Nippon Steel Corporation, Tokyo, Japan

[21] Appl. No.: 08/945,742

[22] PCT Filed: Nov. 15, 1996

[86] PCT No.: PCT/JP96/03362

§ 371 Date: Oct. 28, 1997

§ 102(e) Date: Oct. 28, 1997

[87] PCT Pub. No.: WO97/32675

PCT Pub. Date: Sep. 12, 1997

[30] Foreign Application Priority Data

Mar. 4, 1996 [JP] Japan .................................. 8-070890

[51] Int. Cl.$^7$ ............................ B23K 35/24; B23K 31/02
[52] U.S. Cl. .......................... 228/102; 228/158; 228/224; 219/146.24
[58] Field of Search .................................. 228/158, 102, 228/224; 219/146.24

[56] References Cited

U.S. PATENT DOCUMENTS

| 1,942,364 | 1/1934 | Rood | 219/146.24 |
| 5,219,114 | 6/1993 | Kajiwara et al. | 228/158 |
| 5,234,154 | 8/1993 | Kajiwara et al. | 228/158 |

FOREIGN PATENT DOCUMENTS

| 60-213380 | 10/1985 | Japan | 228/158 |
| 60-213381 | 10/1985 | Japan | 228/158 |
| 4-237584 | 8/1992 | Japan . | |
| 4-327388 | 11/1992 | Japan . | |
| 7-171694 | 7/1995 | Japan . | |
| 8-309402 | 11/1996 | Japan . | |
| 1159838 | 7/1969 | United Kingdom | 219/146.24 |

*Primary Examiner*—Patrick Ryan
*Assistant Examiner*—Jeffrey T. Knapp
*Attorney, Agent, or Firm*—Kenyon & Kenyon

[57] ABSTRACT

A continuous hot rolling method including the steps of: cutting the tail portion of a preceding material in a steel product and the front portion of a succeeding material in the steel product to form butt faces; previously determining the thickness of scale created on the butt faces to determine the proportion of the weight of the scale; calculating the amount of oxygen dissolved in a weld molten zone, determining a deoxidation capacity of a deoxidizer for deoxidizing the above amount of oxygen; allowing the butt faces to abut against each other to form a butt area; applying a laser beam to the butt area to form a weld molten zone; incorporating the deoxidizer having the above deoxidation capacity into the weld molten zone; and hot rolling the molten joined steel product.

13 Claims, 5 Drawing Sheets

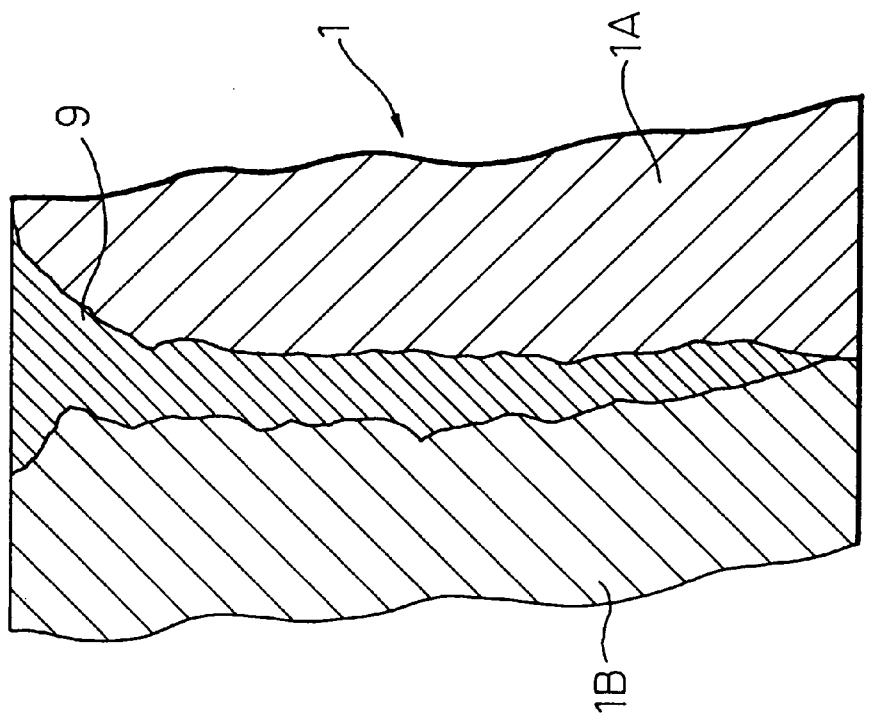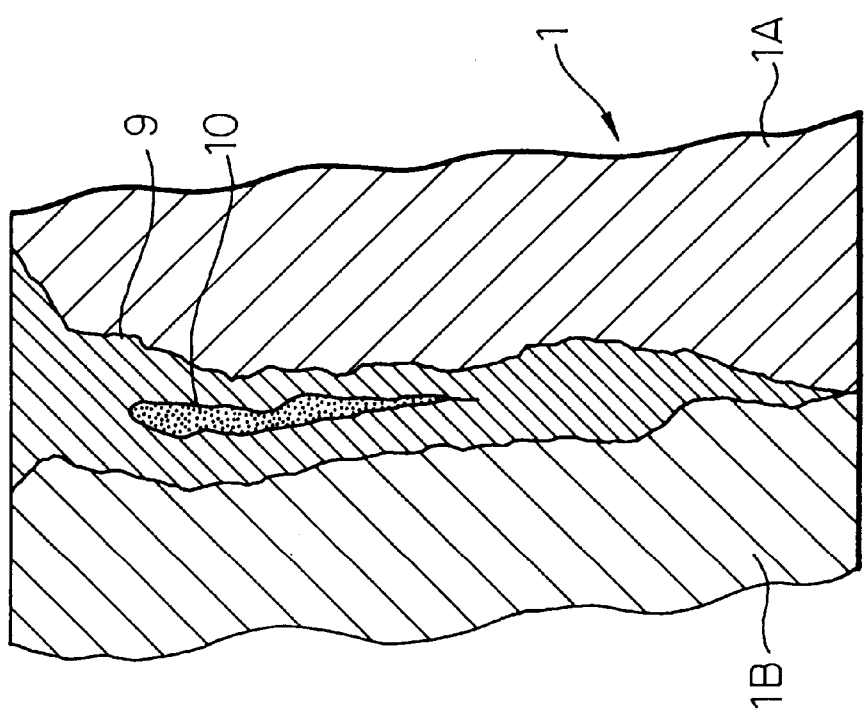

CONTINUOUS HOT ROLLING METHOD

TECHNICAL FIELD

The present invention relates to a method for continuous hot rolling of a steel product and, more particularly, to a method for continuous hot rolling wherein continuous hot rolling is performed in such a state that the tail end of a preceding steel product and the front end of a succeeding steel product have been welded to each other.

BACKGROUND ART

In hot rolling of steel products, in recent years, successive joining of continuous steel products for hot rolling followed by continuous rolling at a predetermined rate, that is, the so called "continuous hot rolling method," has been attempted in order to minimize a deterioration in yield of products on order caused by the creation of scratches or an unacceptable irregular shape due to a strainless state in the so-called "nonstationary portion" particularly in the front end (front portion) and the tail end (tail portion), unacceptable sheet width and thickness due to sledding speed, unacceptable temperature and unacceptable surface quality due to acceleration and the like and, in addition, to minimize removal of defect portions and sheet or plate travelling for finishing operation.

In this continuous hot rolling method, the front end and the tail end of a roughly hot rolled steel product to be fed into a continuous hot rolling mill, or a continuous steel product for hot rolling, such as a high-temperature, small-thickness continuous cast strip (in a sheet or coil form) are previously cut by means of a flying crop shear, the whole area or part of the cut face of the tail end in one steel product is welded to the cut face of the front end in another steel product, a number of continuous steel products for hot rolling are successively hot rolled according to an identical rolling schedule, or alternatively while continuously altering in a relay manner a plurality of schedules, and the hot rolled steel product is then cut and divided and coiled alternately using a plurality of coilers.

Butt electric welding, pressure joining, laser welding and the like have been studied as the welding means. Among them, laser welding is advantageous from the viewpoints of rapidity, joint strength, and quality of the joint.

A laser welding method is disclosed, for example, in Japanese Unexamined Patent Publication (Kokai) No. 4-237584. In the method disclosed in this publication, when end faces of a high carbon steel cut by a laser are abutted against each other followed by laser welding, the laser welding is performed while feeding a filler wire containing 0.3 to 10% by weight of aluminum to the joint.

Specifically, this method is characterized in that laser cutting of a high carbon steel sheet containing not less than 0.5% of carbon permits oxygen evolved from an oxide film formed in the cut face to be fixed as an oxide, enabling joining to be performed even in the step of heating in welding at a very high temperature without creating weld defects from the oxide derived from foaming of the oxide, such as blow holes.

The above publication, however, does not disclose any method for continuously joining a high-temperature steel material or strip of 900° C. or above.

In joining between the cut face of the tail end of one high-temperature steel product and the cut face of the front end of another steel product by laser welding, the amount of scale produced in the cut face of the end portions of the steel products is an important issue.

Specifically, the amount of the scale varies greatly upon the stand-by time defined by the time taken from the completion of cutting of the end portion of the steel product to welding (hereinafter referred to as "atmospheric exposure time") and the chemical composition of the steel product.

In general, scale constituted by an oxide formed on the surface of the steel product and air present around a molten joint are incorporated into a melt pool formed by laser beam irradiation and react with carbon in the steel product to evolve a CO gas. This tendency is more significant in hot joining than in cold joining. The CO gas is evolved not only from the surface of the melt area but also from the interior of the melt, resulting in foaming, which is left as a blow hole. This deteriorates the joint strength between the steel products, leading to a possibility that the joint between the steel products is broken during rolling.

For this reason, the amount of the scale formed in the end portion of the high-temperature steel product should be accurately detected to accurately remove oxygen, evolved from the scale, based on the amount of the scale.

DISCLOSURE OF THE INVENTION

The present invention provides a method which can solve the above problems. This method comprises abutting butt faces of a plurality of high-temperature steel products for hot rolling against each other, successively fusion-joining the steel products by means of a laser, and continuously hot rolling the steel products, characterized in that an iron alloy wire filler containing a deoxidizer in an amount corresponding to the amount of oxygen in scale formed in the butt face is fed in the molten joint.

Specifically, part of the tail end of a preceding material and part of the front end of a succeeding material in a steel product for hot rolling are previously cut with a crop hear or the like to form a butt face.

Subsequently, after the atmospheric exposure time until welding has passed, the thickness ts of the scale formed on the butt face was determined from the detected steel product temperature T, the atmospheric exposure time, and the chemical composition of the steel product. Further, the proportion $W_s$ (relative to the weight of weld molten zone) of the weight of the scale is calculated by the following equation.

$$W_s = (\text{Weight of scale} / \text{Weight of weld molten zone}) \times 100$$

$$= \frac{R_s \cdot 2d \cdot t_s \cdot W + R_s \cdot w \cdot t_s \cdot W}{R_m \cdot d \cdot w \cdot W + R_s \cdot 2d \cdot t_s \cdot W + R_s \cdot w \cdot t_s \cdot W} \times 100$$

$$= \frac{R_s(2d+w) \cdot t_s}{R_m \cdot d \cdot w + R_s(2d+w) \cdot t_s} \times 100$$

$$\approx \frac{R_s(2d+w) \cdot t_s}{R_m \cdot d \cdot w} \times 100$$

Subsequently, the deoxidation capacity K, which is a capacity for removing oxygen evolved at the time of melting of the scale, having the proportion $W_s$ of the weight of the scale in the weld molten zone, is calculated by the following equation.

$$K = 0.3 \cdot 16/72 \cdot W_s$$

The deoxidation capacity K is then compared with the deoxidation capacity Kc of a deoxidizer contained in the steel product. When K is not more than Kc, no iron alloy wire filler is added since the deoxidation capacity of the steel product suffices for preventing the creation of a blow hole.

On the other hand, when K is greater than $K_c$, an iron alloy wire filler comprising at least one member selected from aluminum, titanium, and silicon and having deoxidation capacity $K_f$ is fed to the butt area, formed by abutting butt faces against each other, at such a feed rate (a filler feed rate) as to satisfy the deoxidation capacity K, while a laser beam is applied to the filler to form a weld molten zone.

Specifically, since the steel product contains a deoxidizer comprising at least one member selected from aluminum, titanium, and silicon, the deoxidation capacity K is determined by the following equation.

$$K = K_c \cdot V_c + K_f \cdot V_f$$

wherein $V_c$ is the proportion of the weight of the steel product to the weight of the weld molten zone and $V_f$ is the proportion of the weight of the wire filler fed to the weight of the weld molten zone.

When the steel product contains no deoxidizer, K is equal to $K_f$.

Thus, according to the joining method based on the deoxidation capacities K, $K_c$, and $K_f$, since oxygen evolved from the melted scale in weld molten zone can be satisfactorily removed to completely prevent the creation of the blow hole, the resultant joint has no lowered strength, enabling hot rolling to be continuously performed without any trouble.

BRIEF DESCRIPTION OF THE DRAWINGS

FIG. 5 (a) is a cross-sectional view showing the creation of a blow hole in a weld when $W_s=0.75\%$ by weight and the deoxidation capacity K<0.05% by weight; and FIG. 5 (b) is a cross-sectional view of a weld when $W_s=0.75\%$ by weight and the deoxidation capacity K≧0.05% by weight.

BEST MODE FOR CARRYING OUT THE INVENTION

Figure 1:
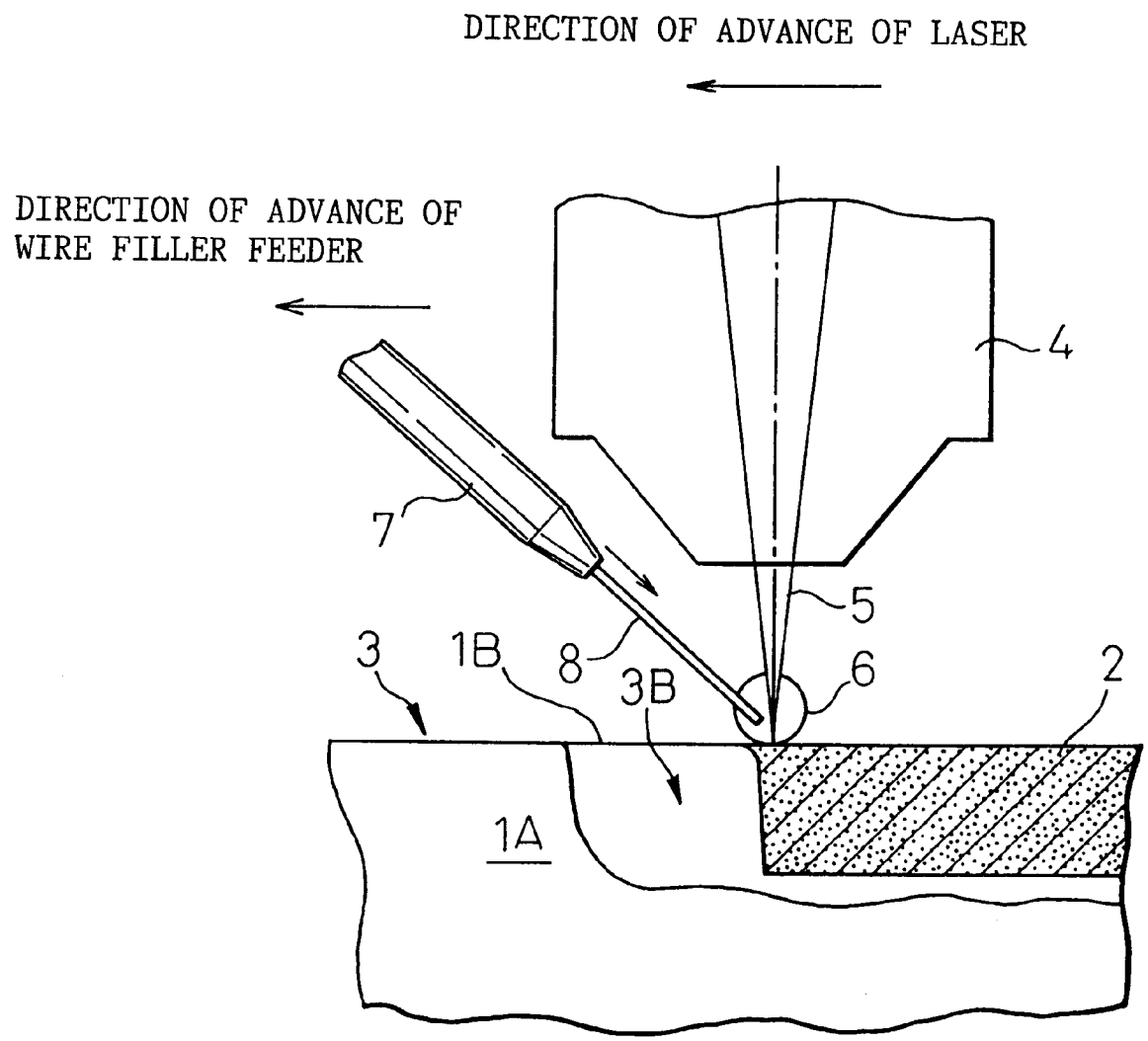
FIG. 1 is a partially sectional front view showing the state of welding according to the present invention.

At the outset, laser welding will be described with reference to FIGS. 1 and 2.

Figure 2:
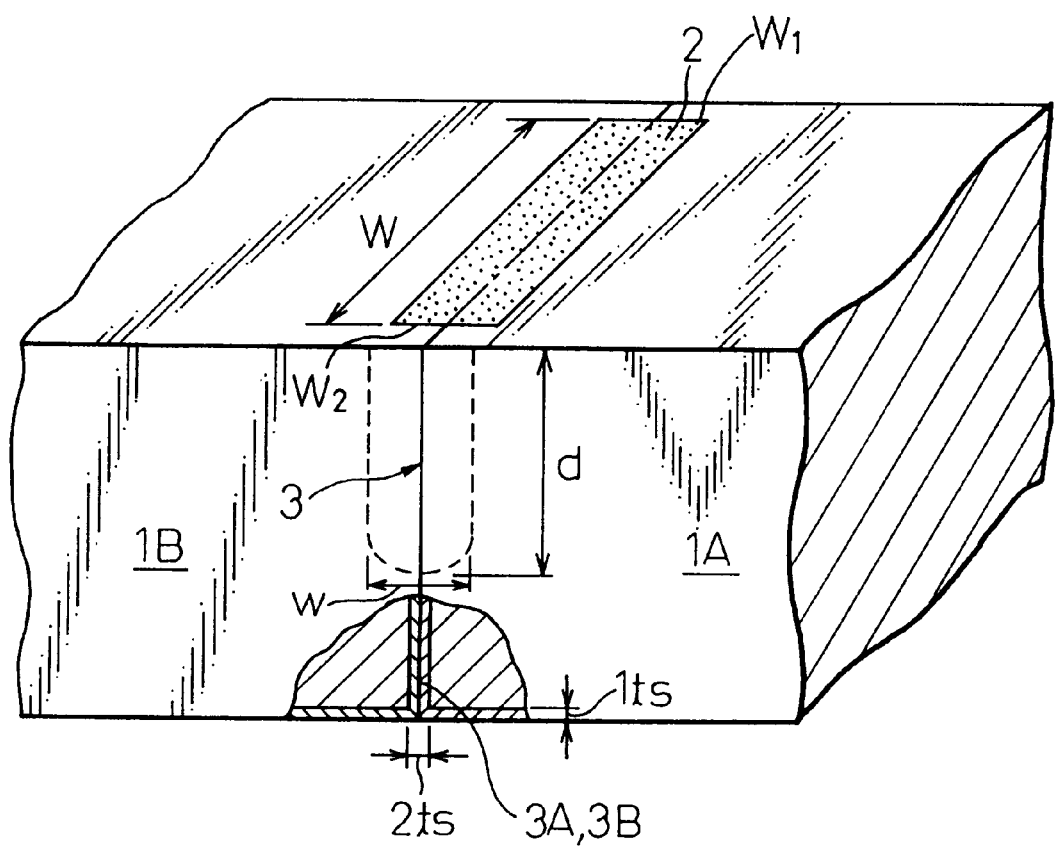
FIG. 2 is a partially sectional schematic perspective view of a weld according to the present invention.

As shown in FIG. 2, a cut area 3A is formed in the tail end of a preceding steel material 1A, and a cut area 3B is formed in the front end of a succeeding material 1B. The cut area 3A is abutted against the cut area 3B to provide a butt area 3. A laser beam 5 is applied from a laser welder 4 to the butt area 3 in the end portion $W_1$ in the widthwise direction of the steel products 1A and 1B to generate plasma 6, thereby forming a weld molten zone (a molten bead) 2. The laser welder 4 is advanced in the widthwise direction of the steel products as shown in FIG. 1 while successively forming a weld molten zone and is stopped at the end portion $W_2$ in the widthwise direction of the steel products.

A wire filler feeder 7 is advanced in the widthwise direction of the steel product interlocked with the travel rate of the laser welder, and a wire filler 8 is continuously fed to the weld molten zone 2 from the wire filler feeder 7.

The fed wire filler 8 is heated by means of the laser beam 5 and added, in a molten state, to the weld molten zone 2.

The molten wire filler added to the weld molten zone 2 is dissolved in a mixture of the molten steel material as a constituent of the weld molten zone with the scale. As a result, the oxidizing power of the metallic element in the wire filler inhibits a reaction of carbon with oxygen in the scale, which is a major cause of the creation of the blow hole, thus preventing the evolution of a CO gas.

Regarding the chemical composition of the wire filler metal, the wire filler should contain an oxide which is not gasified with a metal having high reactivity with oxygen being suitable. Examples of preferred metals for this purpose include iron alloys containing deoxidizing elements, such as aluminum, titanium, and silicon. The iron alloys are preferred from the viewpoint of ensuring the joint strength between the steel products equivalent to that of the steel products. The deoxidizing element is added in an amount of 0.1 to 8.0%. When the amount of the deoxidizing element added is less than 0.1%, the deoxidation reaction in the weld molten zone is unsatisfactory, while when it exceeds 0.8%, the difference in hardness between the weld metal and the base metal is so large that the working and forming properties are deteriorated.

Further, carbon may be incorporated in an amount of 0.05 to 0.15% into the weld molten zone in order to stabilize the texture by refinement of the weld metal and to ensure the strength.

When the steel product contains the above deoxidizing element, the feed rate of the wire filler is regulated so that the content of the deoxidizing element in the wire filler is optimal in the weld molten zone.

In order to optimize the deoxidation in the weld molten zone, the relationship between the amount of the scale dissolved in the weld molten zone and the deoxidation capacity of the deoxidizing element for removing oxygen contained in the scale should be proper.

Figure 3:
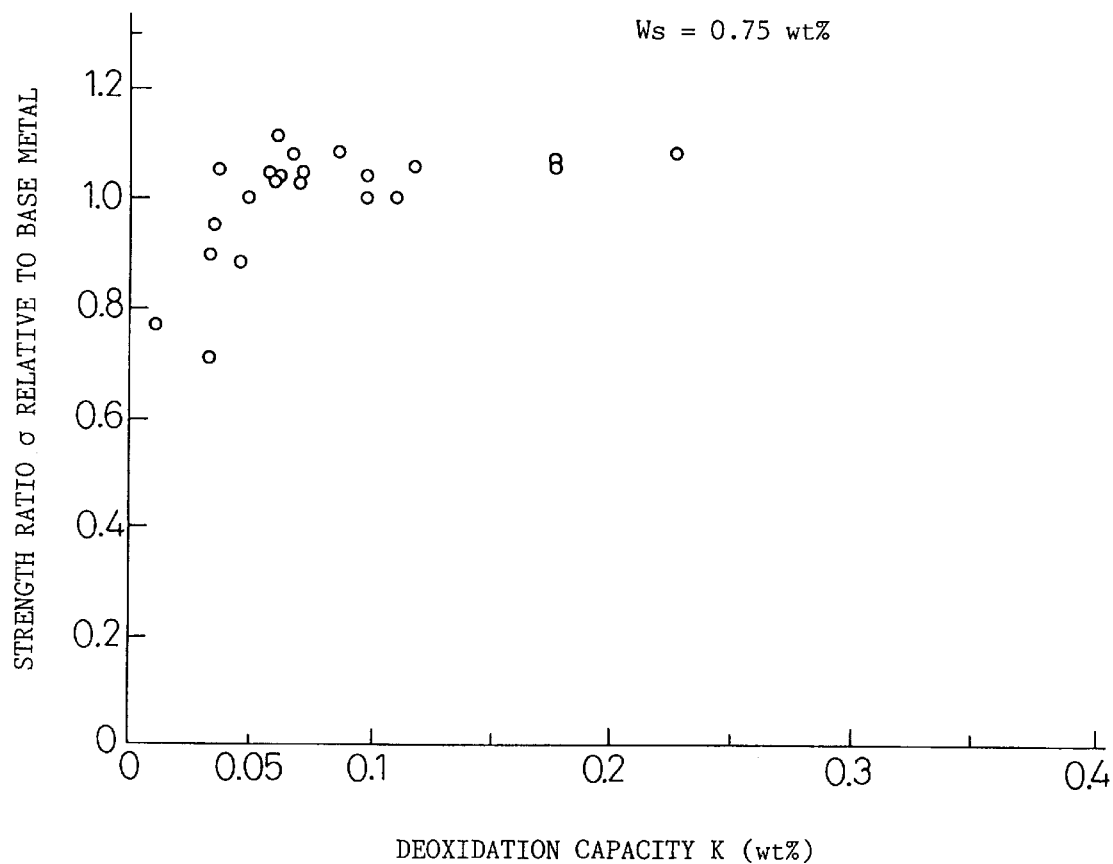
FIG. 3 is a diagram showing the relationship between the deoxidation capacity K and the ratio σ of the tensile strength of the base metal (preceding and succeeding steel products) to the tensile strength of the weld.

FIG. 3 is a diagram showing the relationship between the deoxidation capacity K (wt %) in the case of a proportion of scale weight ((scale weight/weight of weld molten zone) ×100) of 0.75% by weight and the ratio (σ) of the tensile strength of the joint to the tensile strength of the base material. As is apparent from FIG. 3, when K<0.05% by weight, a blow hole is created in the interior of the joint, resulting in deteriorated strength, while when K≧0.05% by weight, a strength comparable with that of the base metal can be ensured. Therefore, optimal deoxidation capacity should be determined according to the weight of the scale.

Based on the above technical recognition, the present invention provides a method for providing a deoxidizing element in a proper amount relative to the amount of the scale, that is, for providing proper deoxidation capacity. This method will be specifically described.

Part of the tail end of a preceding material and part of the front end of a succeeding material in a continuous, small-thickness, cast strip after emerging from a heating furnace, or alternatively part of the front end of a roughly rolled material and part of the tail end of rolled material to be finish rolled are cut with a flying crop shear or the like to form butt faces.

For continuous hot rolling, the butt faces are abutted against each other and molten-welded. In this case, the atmospheric exposure time for molten welding is necessary. At the outset, the time t (atmospheric exposure time) taken from the shear cutting to the welding is calculated by means of a process computer.

Further, the temperature of the material to be rolled is measured with a radiation thermometer, provided on a rolling line, to provide the absolute temperature T of the steel product. The thickness $t_s$ of scale created in the butt face is determined according to the following equation (1).

$$t_s = \frac{1}{R_s} \cdot \sqrt{A \cdot \exp(-Q/R \cdot T) \cdot t} \times 10^6 \; (\mu m) \quad (1)$$

wherein A represents a constant, which varies depending upon the material and, in the case of common carbon steel, is 400 kg·m$^{-4}$·Sec$^{-1}$ at a temperature of 800° C. or above;

Q represents an activation energy possessed by the material and, in the above case, is 33,000 kcal/kmol;

R represents a gas constant and is 1.968; and $R_s$ represents scale density, kg/m$^3$, and, in the above case, 5400 kg/m$^3$.

According to the present invention, the proportion $W_s$, wt %, of scale weight is determined using the scale thickness ts according to the equation (2).

$$W_s = \frac{\begin{array}{c}(\text{Weight of scale in butt face in steel} \\ \text{product} + \text{Weight of scale on top surface} \\ \text{of weld molten zone of steel product})\end{array}}{\text{Weight of weld molten zone}} \times 100 \quad (2)$$

$$= \frac{R_s \cdot 2d \cdot t_s \cdot W + R_s \cdot w \cdot t_s \cdot W}{R_m \cdot d \cdot w \cdot W + R_s \cdot 2d \cdot t_s \cdot W + R_s \cdot w \cdot t_s \cdot W} \times 100$$

$$= \frac{R_s(2d+w) \cdot t_s}{R_m \cdot d \cdot w + R_s(2d+w) \cdot ts} \times 100$$

$$\approx \frac{R_s(2d+w) \cdot t_s}{R_m \cdot d \cdot w} \times 100$$

provided that $R_m \cdot d \cdot w \gg R_s(2d+w) \cdot t_s$ wherein d represents the depth of the melt (mm), w represents the width of the melt (mm), W represents the width of the weld (mm), and $R_m$ represents the density of the steel product (kg/m$^3$).

In the above case, the density of the steel product, $R_m$, is 7,800 kg/m$^3$.

Thereafter, the deoxidation capacity K which is satisfactory for deoxidizing the hot scale is calculated according to the equation (3).

$$K = 0.3 \cdot 16/72 \cdot W_s \quad (3)$$

The proportion of oxygen evolved from the scale is $16/72 \cdot W_s$ as determined from the molecular ratio, wherein 16 is the atomic weight of oxygen and 72 is the molecular weight of FeO. In general, the deoxidation capacity K is set at a larger value relative to the oxygen content. According to experiments conducted by the present inventors, it has been found that, as shown in FIG. 4, oxygen in an amount of not less than 30% of oxygen content of the scale creates a blow hole.

Figure 4:
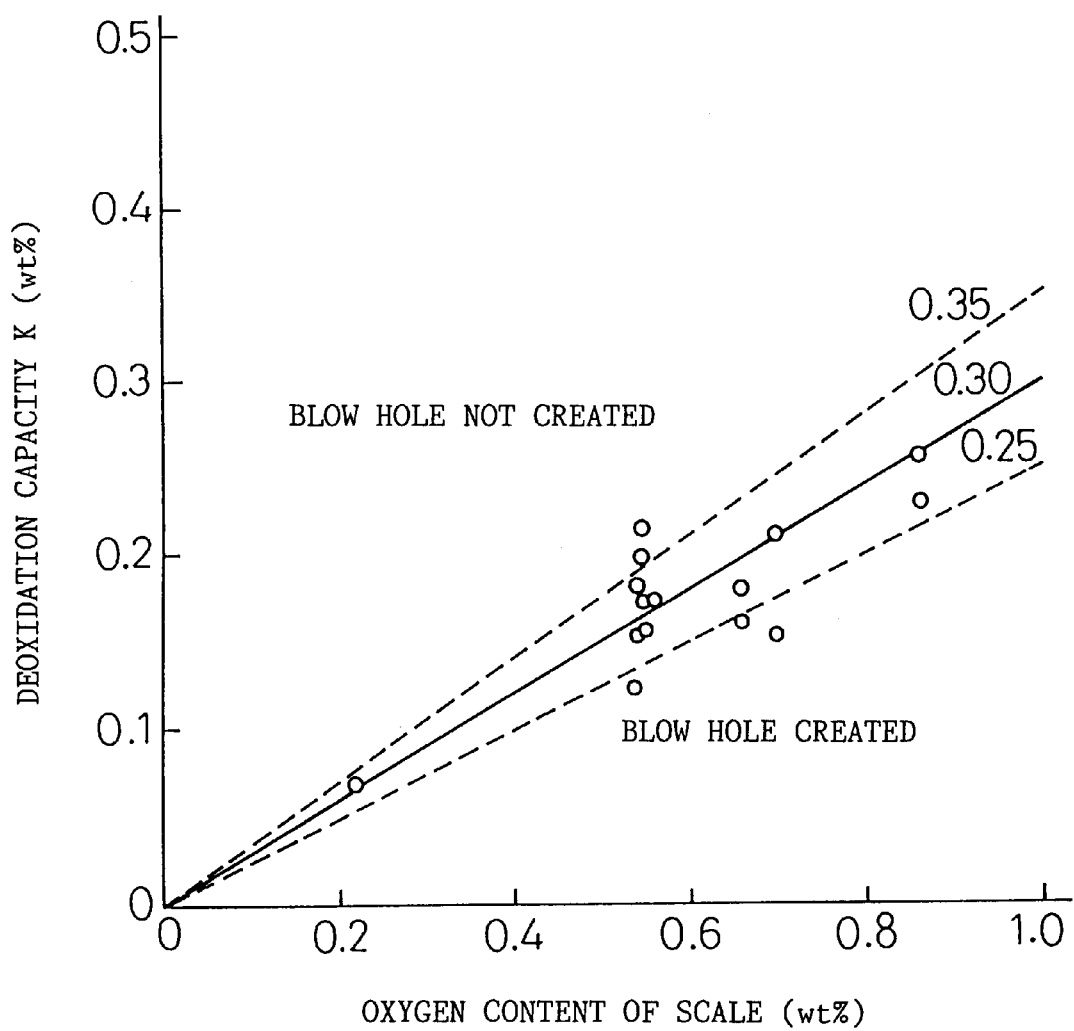
FIG. 4 is a diagram showing the relationship between the oxygen content of the scale and the deoxidation capacity K.

Specifically, FIG. 4 shows the relationship between the oxygen content of the scale and the deoxidation capacity K (deoxidation capacity of the wire filler). From FIG. 4, it is apparent that removal of oxygen in an amount of not less than 30% (in the drawing, a line for 0.30) can eliminate the problem of the creation of the blow hole.

Accordingly, in the present invention, the equation (3) was established based on the recognition that removal of oxygen in an amount of 30% of oxygen in the molten scale could offer satisfactory results.

The deoxidation treatment may be carried out in a K value exceeding the value specified by the equation (3). However, when the K value exceeds 2.4% by weight, the proportion of the deoxidizing element in the weld molten zone exceeds 80%. In this case, the tensile strength is lower than that of the base metal, resulting in an increased possibility that breaking occurs during rolling. For this reason, the K value should not exceed 2.4% by weight.

Therefore, in the above case, the scale should be separately removed, or otherwise the atmospheric exposure time should be shortened.

The deoxidation capacity K is processed according to the following conditions.

At the outset, the deoxidation capacity K is compared with the deoxidation capacity $K_c$ in the steel product to determine whether or not the addition of a deoxidizer by taking advantage of a wire filler is necessary, or the amount of the deoxidizer added. Specifically, (1) when the deoxidation capacity $K_c$ in the steel is $K \leq K_c$, no blow hole is created by virtue of the oxidizing power of the steel. Therefore, in this case, there is no need to add any wire filler. The deoxidation capacity $K_c$ in the steel is expressed by the following equation.

$$K_c = 0.89[\% \, Al]_c + 1.14[\% \, Si]_c + 0.668[\% \, Ti]_c$$

(2) When the steel contains no deoxidizing element, the deoxidation capacity corresponding to the deoxidation capacity K should be imparted by feed of the wire filler alone. That is, $K = K_f$. $K_f$ represents the deoxidation capacity of the wire filler and is expressed by the following equation.

$$K_f = 0.89[\% \, Al]_f + 1.14[\% \, Si]_f + 0.668[\% \, Ti]_f$$

(3) Even though the steel contains a deoxidizing element, when the deoxidation capacity $K_c$ is smaller than the deoxidation capacity K, a wire filler is fed so as to satisfy the following equation.

$$K = K_c \cdot V_c + K_f V_f$$

wherein $V_c$ represents the proportion of the weight of the steel product to the weight of the weld molten zone (wt %) and is expressed by the following equation.

$$V_c = 1 - V_f$$

$$= \frac{R_m \cdot d \cdot w - R_f \cdot \pi/4 \cdot D_f^2 \cdot F_f / F_v}{R_m \cdot d \cdot w}$$

wherein $F_f$: feed rate of wire filler (m/sec),
$F_v$: joining rate (m/sec),
$D_f$: diameter of wire filler (mm), and
$R_f$: density of wire filler (kg/m$^2$).
$V_f$ represents the proportion of the weight of the wire filler fed to the weight of the weld molten zone and is expressed by the following equation.

$$V_f = \frac{R_f \cdot \pi/4 \cdot D_f^2 \cdot F_f / F_v}{R_m \cdot d \cdot w + R_f \cdot \pi/4 \cdot D_f^2 \cdot F_f / F_v}$$

$$\approx \frac{R_f \cdot \pi/4 \cdot D_f^2 \cdot F_f / F_v}{R_m \cdot d \cdot w}$$

provided that $R_m \cdot d \cdot w \gg R_f \cdot \pi/4 \cdot D_f^2 \cdot F_f / F_v$.

As described above, after the determination of the proportion $W_s$ of scale weight of the butt face followed by the determination of the deoxidation capacity K for the scale, a wire filler is fed at a desired rate in a predetermined amount to impart the deoxidation capacity corresponding to the deoxidation capacity K to the weld molten zone.

Specifically, in the case of the above (2), the wire filler feed rate $F_f$ is calculated by the following quation (4).

$$F_f = \frac{(R_m \cdot d \cdot w) \cdot (0.3 \cdot 16/72 \cdot W_s)}{\pi/4 \cdot D_f^2 \cdot R_f \cdot K_f} \cdot F_v \quad (4)$$

On the other hand, in the case of the above (3), the wire filler feed rate $F_f$ is calculated by the following equation (5).

$$F_f = \frac{(R_m \cdot d \cdot w) \cdot (0.3 \cdot 16/72 \cdot W_s - K_c)}{\pi/4 \cdot D_f^2 \cdot R_f \cdot (K_f - K_c)} \cdot F_v \quad (5)$$

Thus, while a wire filler is, if necessary, fed to the butt portion of the steel products, a laser beam is applied from a laser device to melt the wire filler and the butt portion, thereby forming a weld molten zone.

Consequently, a sound weld molten zone can be formed while removing oxygen in the scale dissolved in the weld molten zone so as not to create a blow hole, resulting in improved joint strength, which enables continuous hot rolling to be perfumed without any trouble.

EXAMPLES

Examples of the present invention will be described. In these examples, a continuous hot finish rolling mill with seven stands was used for hot rolling, and joining of the steel product was performed in a flying joining zone provided on the inlet side of the finish rolling mill.

The chemical composition (wt %) and dimension of welding steel products and welding conditions and results are summarized in Tables 1 to 4. Besides Examples 1 to 8, comparative examples wherein the deoxidation capacity exceeds the specific value of the K value or below the K value are also summarized in Tables 1 to 4.

For Examples 1 to 8, various steel products were joined. In this case, the deoxidation capacity of each fusion weld exceeds the K value. Therefore, no blowhole was created in the joint, the ratio of the tensile strength of the joint to the tensile strength of the preceding and succeeding steel products was not deteriorated and fell within an acceptable range, that is, in the range of from 0.8 to 1.0, and the joint was not broken at all during continuous hot rolling.

For Example 5, Kc value was larger than K. Since, however, the difference between Kc and K was so small that the wire filler was added at a rate of one half of the feed rate in the other examples. For Examples 6 to 8, the Kc value was much larger than the K value, and, therefore, no wire filler was fed.

On the other hand, for Comparative Example 1, since the value of $(K_c \cdot V_c + K_f \cdot V_f)$ exceeded the specific value 2.4% by weight in the K value, unfavorable phenomena occurred. The phenomena included the quality of the joint being deteriorated, the tensile strength being deteriorated, and, after the continuous hot finish rolling, frequent breaking occurred in the central portion in the joint.

For Comparative Example 2, since the value of $(K_c \cdot V_c + K_f \cdot V_f)$ was lower than the K value, a blow hole was created in the joint. This resulted in breaking between the 4th stand and the 5th stand during finish rolling in the hot rolling, and, therefore, the continuous rolling was stopped.

FIG. 5 (a) is a schematic cross-sectional view of the joint in Comparative Example 2. In the drawing, the tail end 1A of the preceding steel product and the front end 1B of the succeeding steel product were melted and solidified to form a bead 9. A blow hole 10 was created in the central portion of the bead.

FIG. 5 (b) is a schematic cross-sectional view of the joint in Example 1. In this joint, no blow hole was created in the bead 9, and the joint was sound.

TABLE 1

|  |  |  | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|---|
| Preceding steel product | Constituents | C (%) | 0.06 | 0.03 | 0.10 | 0.18 | 0.16 | 0.17 | 0.21 | 0.00 | 0.18 | 0.03 |
|  |  | Mn (%) | 0.23 | 0.26 | 0.32 | 0.94 | 0.47 | 0.50 | 1.44 | 0.13 | 0.94 | 0.26 |
|  |  | Si (%) | 0.02 | 0.02 | 0.01 | 0.02 | 0.05 | 0.15 | 1.51 | 0.01 | 0.02 | 0.02 |
|  |  | P (%) | 0.02 | 0.01 | 0.01 | 0.02 | 0.01 | 0.02 | 0.00 | 0.01 | 0.02 | 0.01 |
|  |  | S (%) | 0.01 | 0.01 | 0.01 | 0.01 | 0.01 | 0.01 | 0.01 | 0.00 | 0.01 | 0.01 |
|  |  | Al (%) | 0.03 | 0.01 | 0.02 | 0.02 | 0.01 | 0.01 | 0.02 | 0.05 | 0.02 | 0.01 |
|  |  | Ti (%) | 0.00 | 0.00 | 0.00 | 0.00 | 0.00 | 0.00 | 0.00 | 0.08 | 0.00 | 0.00 |
|  | Dimension | Width (mm) | 900 | 900 | 900 | 1200 | 1200 | 1200 | 1800 | 1800 | 1800 | 1000 |
|  |  | Thickness (mm) | 30 | 30 | 30 | 50 | 50 | 50 | 60 | 60 | 60 | 60 |
|  | Tensile strength (kgf/mm$^2$) |  | 7 | 6 | 8 | 8 | 8 | 8 | 8 | 5 | 8 | 8 |
|  | Temp. T (K) |  | 1273 | 1273 | 1273 | 1273 | 1273 | 1273 | 1273 | 1273 | 1273 | 1273 |
|  | Density $R_m$ (kg/m$^3$) |  | 7800 | 7800 | 7800 | 7800 | 7800 | 7800 | 7800 | 7800 | 7800 | 7800 |

TABLE 2

|  |  |  | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|---|---|
| Succeeding steel product | Constituents | C (%) | 0.06 | 0.03 | 0.10 | 0.18 | 0.16 | 0.17 | 0.21 | 0.00 | 0.18 | 0.03 |
|  |  | Mn (%) | 0.23 | 0.26 | 0.32 | 0.94 | 0.47 | 0.50 | 1.44 | 0.13 | 0.94 | 0.26 |
|  |  | Si (%) | 0.02 | 0.02 | 0.01 | 0.02 | 0.05 | 0.15 | 1.51 | 0.01 | 0.02 | 0.02 |
|  |  | P (%) | 0.02 | 0.01 | 0.01 | 0.02 | 0.01 | 0.02 | 0.00 | 0.01 | 0.02 | 0.01 |
|  |  | S (%) | 0.01 | 0.01 | 0.01 | 0.01 | 0.01 | 0.01 | 0.01 | 0.00 | 0.01 | 0.01 |
|  |  | Al (%) | 0.03 | 0.01 | 0.02 | 0.02 | 0.01 | 0.01 | 0.02 | 0.05 | 0.02 | 0.02 |
|  |  | Ti (%) | 0.00 | 0.00 | 0.00 | 0.00 | 0.00 | 0.00 | 0.00 | 0.08 | 0.00 | 0.00 |
|  | Dimension | Width (mm) | 900 | 900 | 900 | 1200 | 1200 | 1200 | 1900 | 1800 | 1900 | 1000 |
|  |  | Thickness (mm) | 30 | 30 | 30 | 50 | 50 | 50 | 60 | 50 | 50 | 60 |
|  | Tensile strength (kgf/mm$^2$) |  | 7 | 6 | 8 | 8 | 8 | 8 | 8 | 5 | 8 | 8 |
|  | Temp. T (K) |  | 1273 | 1273 | 1273 | 1273 | 1273 | 1273 | 1273 | 1273 | 1273 | 1273 |
|  | Density $R_m$ (kg/m$^3$) |  | 7800 | 7800 | 7800 | 7800 | 7800 | 7800 | 7800 | 7800 | 7800 | 7800 |

TABLE 3

| Specification | Ex. 1 | Ex. 2 | Ex. 3 | Ex. 4 | Ex. 5 | Ex. 6 | Ex. 7 | Ex. 8 | Comp. Ex. 1 | Comp. Ex. 2 |
|---|---|---|---|---|---|---|---|---|---|---|
| Joining Shape of section of butted portion between end face of preceding steel material and end face of succeeding steel material A: Preceding steel material B: Succeeding steel material | B⟩⟨A | B⟩⟨A | B⟩⟨A | B⟩⟨A | B⟩⟨A | B⟩⟨A | B⟩⟨A | B⟩⟨A | B⟩⟨A | B⟩⟨A |
| Joining laser Type | $CO_2$ Laser | | | | | | | | | |
| Specification (kW) | 45 | | | | | | | | | |
| Travel rate $F_v$ (mpm) | 5 | | | | | | | | | |
| Melt depth d (mm) | 20 | 20 | 20 | 20 | 20 | 20 | 20 | 20 | 20 | 20 |
| Melt width w (mm) | 5 | 5 | 5 | 5 | 5 | 5 | 5 | 5 | 5 | 5 |
| Iron alloy wire filler | | | | | | | | | | |
| Diameter $D_f$ (mm) | 1.6 | | | | | | | | | |
| C (%) | 0.10 | 0.10 | 0.10 | 0.10 | 0.10 | 0.10 | 0.10 | 0.10 | 0.10 | 0.10 |
| Al (%) | 3.2 | 3.2 | 3.2 | 3.2 | 3.2 | 3.2 | 3.2 | 3.2 | 50.0 | 3.2 |
| Si (%) | 1.9 | 1.9 | 1.9 | 1.9 | 1.9 | 1.9 | 1.9 | 1.9 | 20.0 | 1.9 |
| Ti (%) | 3.2 | 3.2 | 3.2 | 3.2 | 3.2 | 3.2 | 3.2 | 3.2 | 20.0 | 3.2 |
| Density $R_f$ (kg/m³) | 6400 | 6400 | 6400 | 6400 | 6400 | 6400 | 6400 | 6400 | 6400 | 6400 |
| Feed rate $F_f$ (m/m) | 0.09 | 1.15 | 0.48 | 1.11 | 0 | 0 | 0 | 0 | 0.04 | 0.47 |
| Actual feed rate $F_f$ (m/m) | 1.0 | 1.2 | 1.2 | 1.2 | 0.5 | 0 | 0 | 0 | 9.0 | 0.3 |
| Scale | | | | | | | | | | |
| Time of exposure to the air t(sec) | 30 | 40 | 30 | 50 | 40 | 40 | 60 | 30 | 40 | 40 |
| Scale thickness in each end face $t_s$ (μm) | 28 | 32 | 28 | 36 | 32 | 32 | 40 | 28 | 32 | 32 |
| Proportion of scale weight $W_s$ (%) | 0.052 | 0.059 | 0.052 | 0.067 | 0.059 | 0.059 | 0.074 | 0.052 | 0.052 | 0.052 |
| Deoxidation capacity | | | | | | | | | | |
| K (%) | 0.052 | 0.059 | 0.052 | 0.067 | 0.059 | 0.059 | 0.074 | 0.052 | 0.052 | 0.052 |
| $K_s$ (%) | 0.050 | 0.032 | 0.029 | 0.041 | 0.066 | 0.180 | 0.174 | 0.109 | 0.041 | 0.041 |
| $K_f$ (%) | 7.15 | 7.15 | 7.15 | 7.15 | 7.15 | 0 | 0 | 0 | 87.05 | 7.15 |
| $V_s$ (%) | 0.997 | 0.996 | 0.996 | 0.996 | 0.998 | 1.0 | 1.0 | 1.0 | 0.970 | 0.999 |
| $V_f$ (%) | 0.003 | 0.004 | 0.004 | 0.004 | 0.002 | 0 | 0 | 0 | 0.030 | 0.001 |
| Kc · Vc + Kf · Vf (%) | 0.071 | 0.060 | 0.057 | 0.070 | 0.080 | 0.180 | 0.174 | 0.109 | 2.65 | 0.048 |
| K(Kc · Vc + Kf · Vf) | O | O | O | O | O | O | O | O | X | X |

Note: In the table, % is by weight.

TABLE 4

| | | Ex. | | | | | | | | Comp. Ex. | |
|---|---|---|---|---|---|---|---|---|---|---|---|
| | | 1 | 2 | 3 | 4 | 5 | 6 | 7 | 8 | 1 | 2 |
| Results of joining | Ratio of tensile strength of joint to tensile strength of preceding and succeeding steel products (σ) | 1.02 | 1.01 | 1.02 | 1.00 | 1.01 | 1.02 | 1.01 | 1.01 | 0.60 | 0.60 |
| | Blow hole | Absent | Absent | Absent | Absent | Absent | Absent | Absent | Absent | Absent | Present |
| Hot rolling | Rolling rate (mpm) | 70 | 70 | 65 | 70 | 80 | 70 | 65 | 80 | 70 | 70 |
| | Total reduction (mm) | 24 | 25 | 28 | 42 | 42 | 42 | 50 | 50 | 42 | 42 |
| | Tension (kgf/mm²) | 5 | 4 | 4 | 5 | 5 | 3 | 2 | 4 | 5 | 5 |
| Rolling results | Breaking in joint | Absent | Absent | Absent | Absent | Absent | Absent | Absent | Absent | Creation of hole in central portion | Breaking between the 4th stand and the 5th stand |

INDUSTRIAL APPLICABILITY

As is apparent from the foregoing detailed description, a sound joint can be formed without creating any blow hole in the tail end of a preceding steel product and the front end of a succeeding steel material, enabling continuous hot rolling to be stably carried out. This contributes to an improvement in yield of rolling. Therefore, the industrial effect provided by the present invention is very large.

We claim:

1. A continuous hot rolling method comprising successively jointing a plurality of hot rolling steel products and continuously conducting hot rolling, said method comprising the steps of:

cutting part of a tail portion of a preceding material in the steel product and a front portion of a succeeding material in the steel product to form butt faces;

determining the thickness of scale created on the butt faces, providing the proportion of the weight of the scale from the thickness of the scale, calculating the amount of oxygen dissolved in a weld molten zone, and determining the deoxidation capacity K of a deoxidizer for removing oxygen in said amount;

allowing the butt faces to abut against each other to form a butt area, applying a laser beam from a laser device to the butt area to form a weld molten zone, and incorporating the deoxidizer having deoxidation capacity K into the weld molten zone; and hot rolling the melt-joined steel product.

2. The continuous hot rolling method according to claim 1, wherein the steel product contains a deoxidizer having a deoxidation capacity Kc which is not less than the deoxidation capacity K.

3. The continuous hot rolling method according to claim 1, wherein the absolute temperature T of the steel product and an atmospheric exposure time defined by the time taken from the cutting of the steel product to the abutting of the butt faces is detected and the thickness $t_s$ of scale is determined by the following equation:

$$t_s = \frac{1}{R_s} \cdot \sqrt{A \cdot \exp(-Q/R \cdot T) \cdot t} \times 10^6 \; (\mu m) \quad (1)$$

wherein A: constant,

Q: active energy of the material (kcal/kmol),

R: gas constant (kcal/kmol.K),

T: absolute temperature of the steel product (K), t: atmospheric exposure time (sec), and $R_s$: scale density (kg/m³).

4. The continuous hot rolling method according to claim 1, wherein the proportion $W_s$ of the weight of the scale is determined based on the thickness $t_s$ of the scale by the following equation (2):

$$W_s = (\text{Weight of scale} / \text{Weight of weld molten zone}) \times 100 \quad (2)$$

$$= \frac{(\text{Weight of scale in butt face in steel product} + \text{Weight of scale on top surface of weld molten zone of steel product})}{\text{Weight of weld molten zone}} \times 100$$

$$= \frac{R_s \cdot 2d \cdot t_s \cdot W + R_s \cdot w \cdot t_s \cdot W}{R_m \cdot d \cdot w \cdot W + R_s \cdot 2d \cdot t_s \cdot W + R_s \cdot w \cdot t_s \cdot W} \times 100$$

$$= \frac{R_s(2d+w) \cdot t_s}{R_m \cdot d \cdot w + R_s(2d+w) \cdot ts} \times 100$$

$$\approx \frac{R_s(2d+w) \cdot t_s}{R_m \cdot d \cdot w} \times 100 \; (\text{wt} \%)$$

provided that $R_m \cdot d \cdot w >> R_s(2d+w) \cdot t_s$, wherein $R_m$: density of steel product (kg/m³), W: weld width (mm), w: melt width (mm), and d: melt depth.

5. The continuous hot rolling method according to claim 1, wherein, after emergence of the steel product to be hot rolled from a heating furnace, the tail portion of the preceding material in the steel product and the front portion of the succeeding material in the steel product are cut, the cut faces are abutted against each other to conduct melt joining and the melt-joined steel product is hot rolled.

6. The continuous hot rolling method according to claim 1, wherein the front portion of the succeeding material in the rough rolled steel product and the tail portion of the preceding material in the steel product to be finish rolled are cut, the cut faces are abutted against each other and subjected to molten joining and the molten joined steel product is then subjected to finish rolling.

7. The continuous hot rolling method according to claim 1, wherein the deoxidation capacity K is compared with deoxidation capacity Kc in the steel product to detect the shortage and an iron alloy wire filler containing a deoxidizer in an amount to compensate for the shortage is fed into the butt area.

8. The continuous hot rolling method according to claim 7, wherein the iron alloy wire filler comprises at least one member selected from aluminum, titanium, and silicon each in an amount of 0.1 to 8.0% by weight with the balance consisting of iron and has a deoxidation capacity $K_f$.

9. The continuous hot rolling method according to claim 8, wherein carbon is further incorporated in an amount of 0.05 to 0.15% by weight into the weld molten zone by taking advantage of the wire filler.

10. The continuous hot rolling method according to claim 1, wherein the deoxidation capacity K is determined based on the proportion Ws of the weight of the scale by the following equation (3):

$$K = 0.3 \cdot 16/72 \cdot W_s \text{ (wt \%)} \tag{3}$$

wherein 0.3: proportion of scale, contributing to the formation of a blowhole, in the scale incorporated in the weld molten zone, and 16/72: proportion of oxygen in the scale.

11. The continuous hot rolling method according to claim 10, wherein the deoxidation capacity K corresponds to at least one of the following equations given by the deoxidation capacity Kc of the steel product, the proportion Vc of the weight of the steel product to the weight of the weld molten zone, the deoxidation capacity $K_f$ of the wire filler, and the proportion $V_f$ of the weight of fed wire filler to the weight of the weld molten zone:

$K = K_c$, $K = K_f$, or $K = K_c \cdot V_c + K_f \cdot V_f$ wherein $K_c = 0.89[\% \text{ Al}]_c + 1.14[\% \text{ Si}]_c + 0.6[\% \text{ Ti}]_c$ $$V_c = (R_m \cdot d \cdot w - R_f \cdot \pi/4 \cdot D_f^2 \cdot F_f/F_v)/R_m \cdot d \cdot w$$

$$K_f = 0.89[\% \text{ Al}]_f + 1.14[\% \text{ Si}]_f + 0.668[\% \text{ Ti}]_f$$

$$V_f = \frac{R_f \cdot \pi/4 \cdot D_f^2 \cdot F_f/F_v}{R_m \cdot d \cdot w + R_f \cdot \pi/4 \cdot D_f^2 \cdot F_f/F_v}$$

$$\approx \frac{R_f \cdot \pi/4 \cdot D_f^2 \cdot F_f/F_v}{R_m \cdot d \cdot w}$$

provided that $R_m \cdot d \cdot w \gg R_f \cdot \pi/4 \cdot D_f^2 \cdot F_f/F_v$, wherein $F_v$: welding speed (m/sec), $D_f$: diameter of wire filler (mm), and $F_f$: feed rate of wire filler (m/sec).

12. The continuous hot rolling method according to claim 11, wherein when the deoxidation capacity K is $K = K_f$, the iron alloy wire filler is fed to the weld molten zone at a feed rate $F_f$ based on the following equation (4):

$$F_f = \frac{(R_m \cdot d \cdot w) \cdot (0.3 \cdot 16/72 \cdot W_s)}{\pi/4 \cdot D_f^2 \cdot R_f \cdot K_f} \cdot F_v \tag{4}$$

13. The continuous hot rolling method according to claim 11, wherein when the deoxidation capacity K is $K = K_c \cdot V_c + K_f \cdot V_f$, the iron alloy wire filler is fed to the weld molten zone at a feed rate $F_f$ based on the following equation (5):

$$F_f = \frac{(R_m \cdot d \cdot w) \cdot (0.3 \cdot 16/72 \cdot W_s - K_c)}{\pi/4 \cdot D_f^2 \cdot R_f \cdot (K_f - K_c)} \cdot F_v \tag{5}$$

* * * * *

UNITED STATES PATENT AND TRADEMARK OFFICE
CERTIFICATE OF CORRECTION

PATENT NO. : 6,068,177
DATED : May 30, 2000
INVENTOR(S) : Shinji Matsuo et al.

It is certified that error appears in the above-identified patent and that said Letters Patent is hereby corrected as shown below:

ABSTRACT,
Line 1, change "including" to -- comprising --.

Table 3,
Line beginning "Proportion of scale weight..." every number across that entire line should be change as follows:

Change "0.052" to -- 0.78 --.
Change "0.059" to -- 0.89 --.
Change "0.052" to -- 0.78 --.
Change "0.067" to -- 1.00 --.
Change "0.059" to -- 0.89 --.
Change "0.059" to -- 0.89 --.
Change "0.074" to -- 1.11 --.
Change "0.052" to -- 0.78 --.
Change "0.052" to -- 0.89 --.
Change "0.052" to -- 0.89 --.

Signed and Sealed this

Eleventh Day of December, 2001

*Attest:*

NICHOLAS P. GODICI
*Attesting Officer*     *Acting Director of the United States Patent and Trademark Office*